July 23, 1940.  H. E. RUE  2,208,644
FISH TREATING MACHINE
Filed July 27, 1938    9 Sheets-Sheet 6

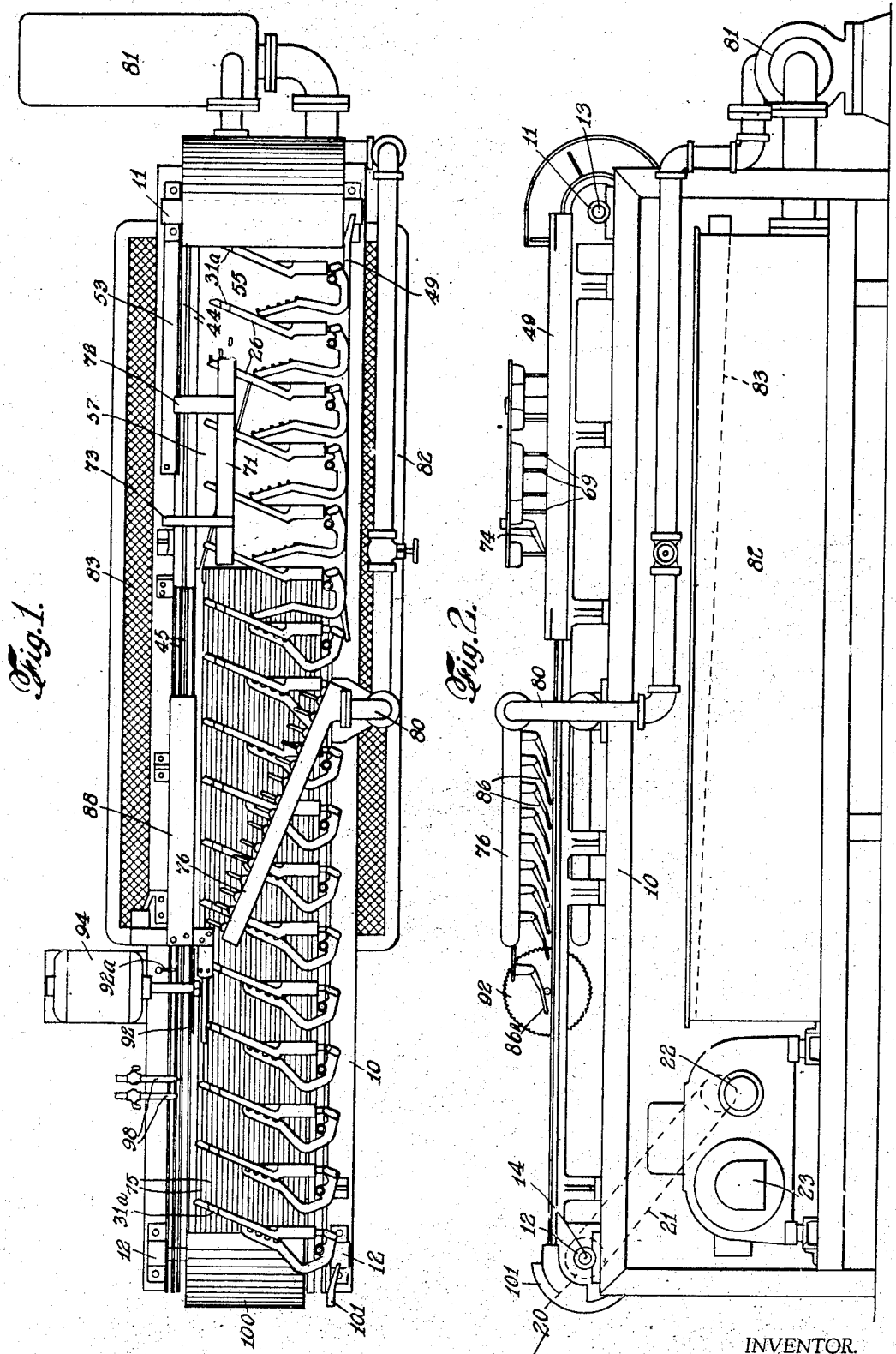

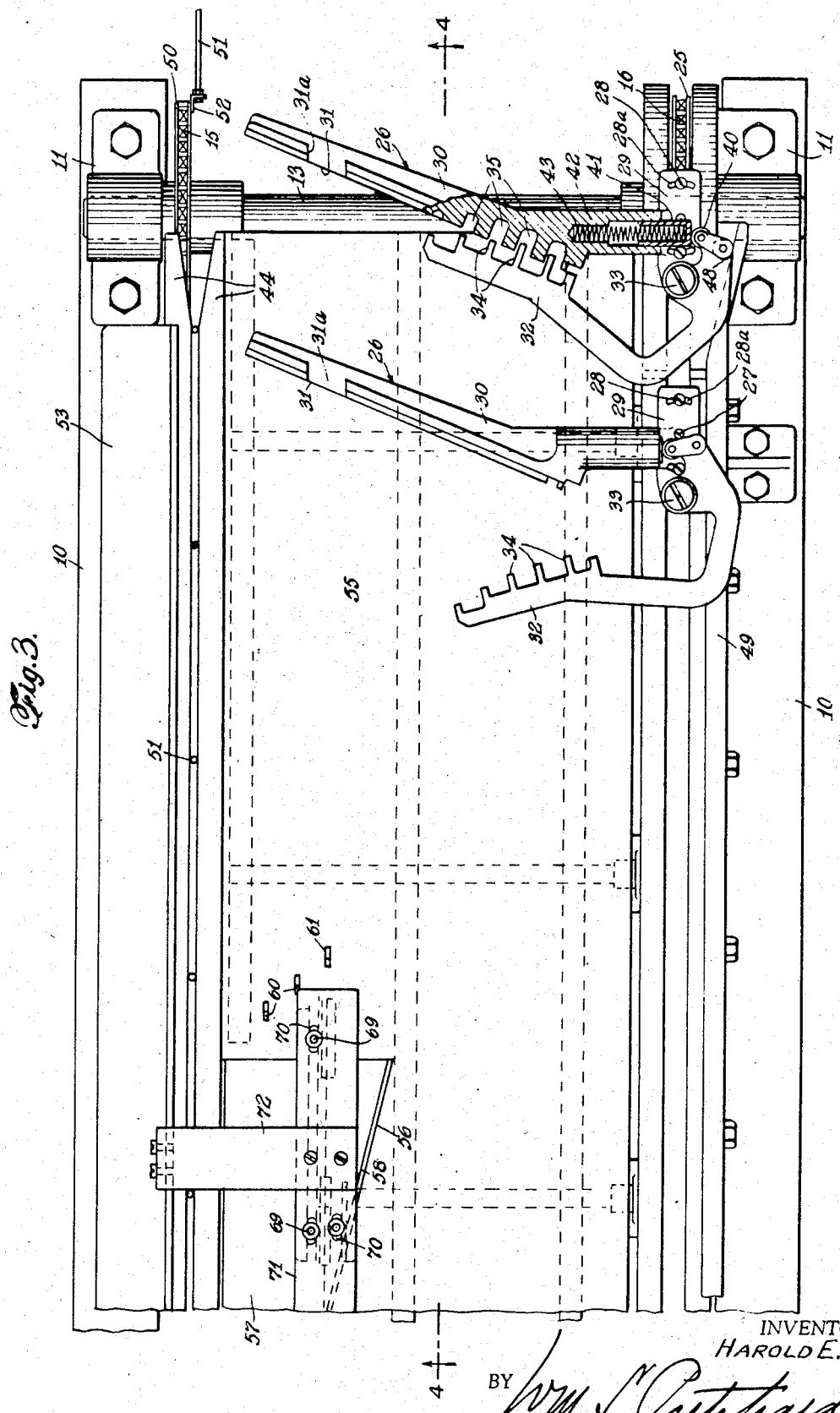

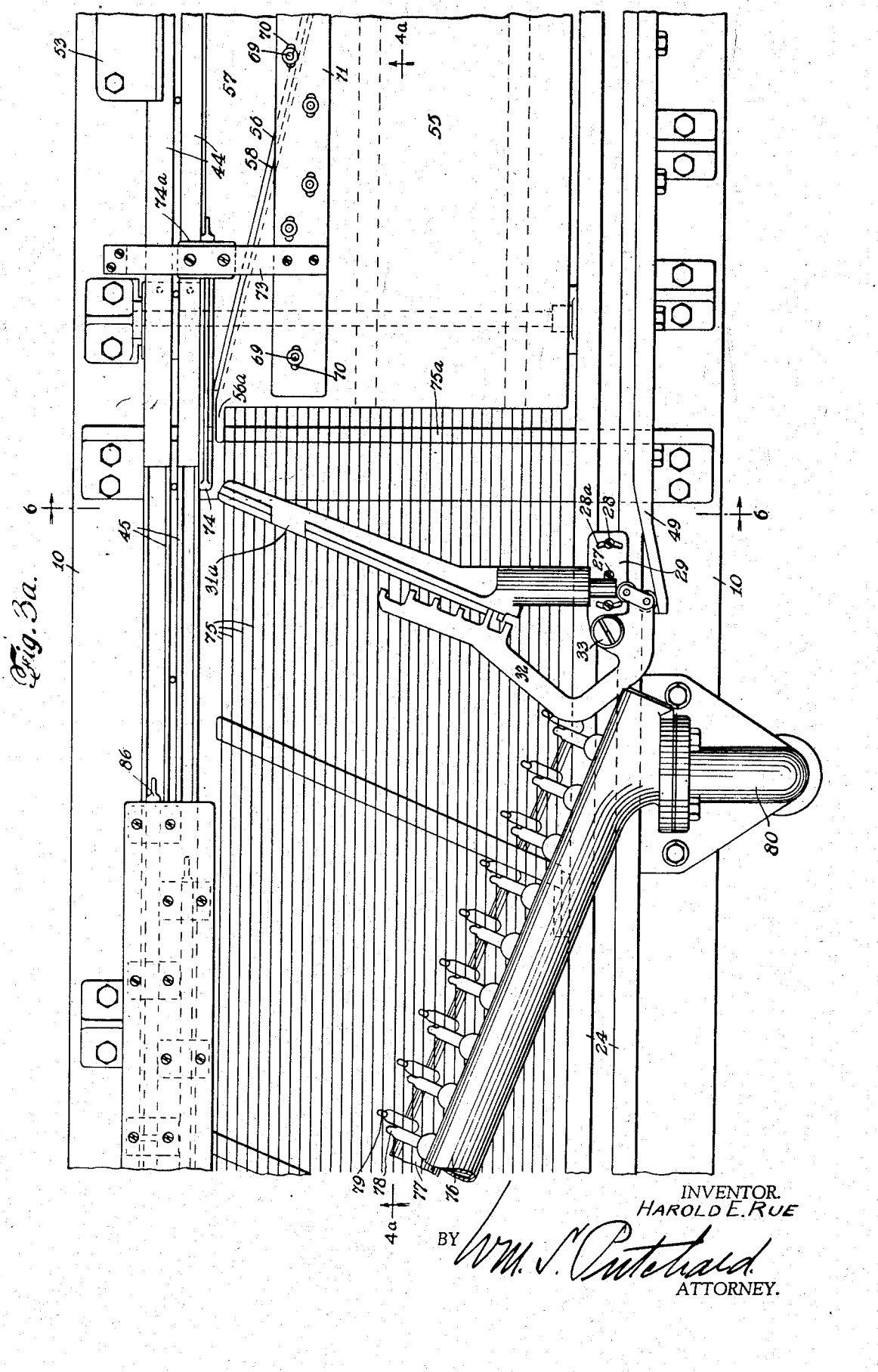

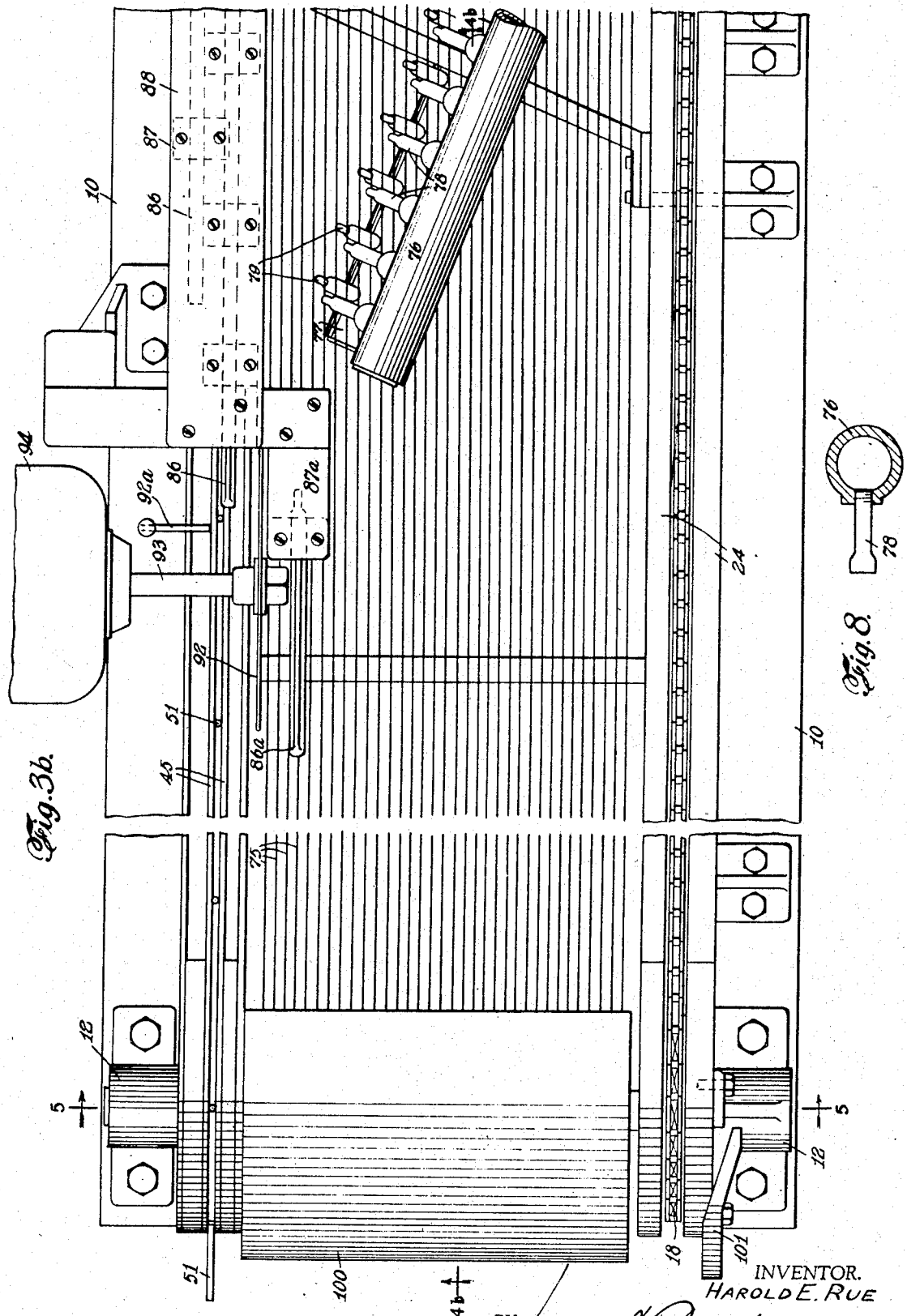

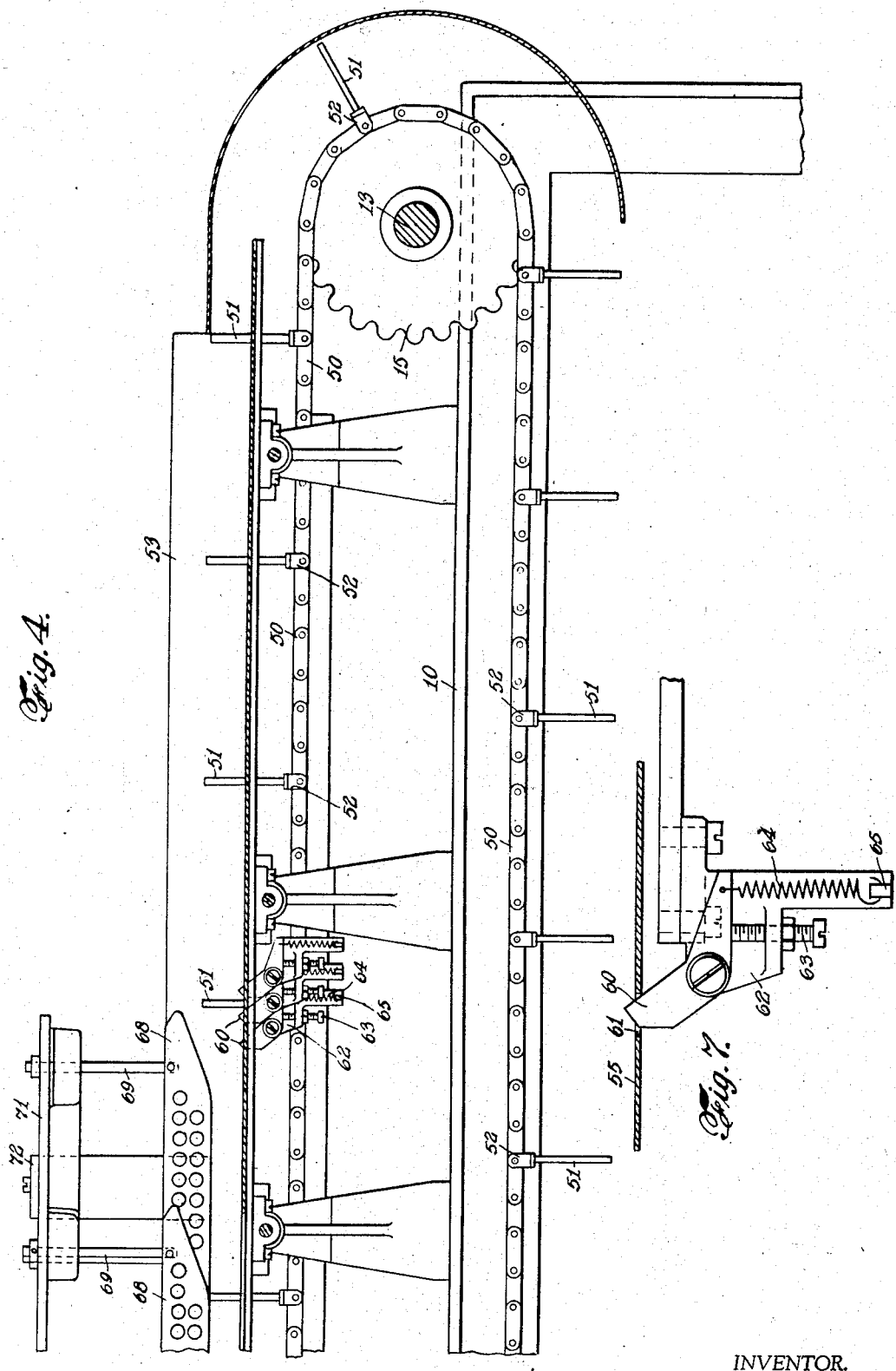

INVENTOR.
HAROLD E. RUE
BY Wm. S. Pritchard
ATTORNEY.

July 23, 1940.   H. E. RUE   2,208,644
FISH TREATING MACHINE
Filed July 27, 1938   9 Sheets-Sheet 7
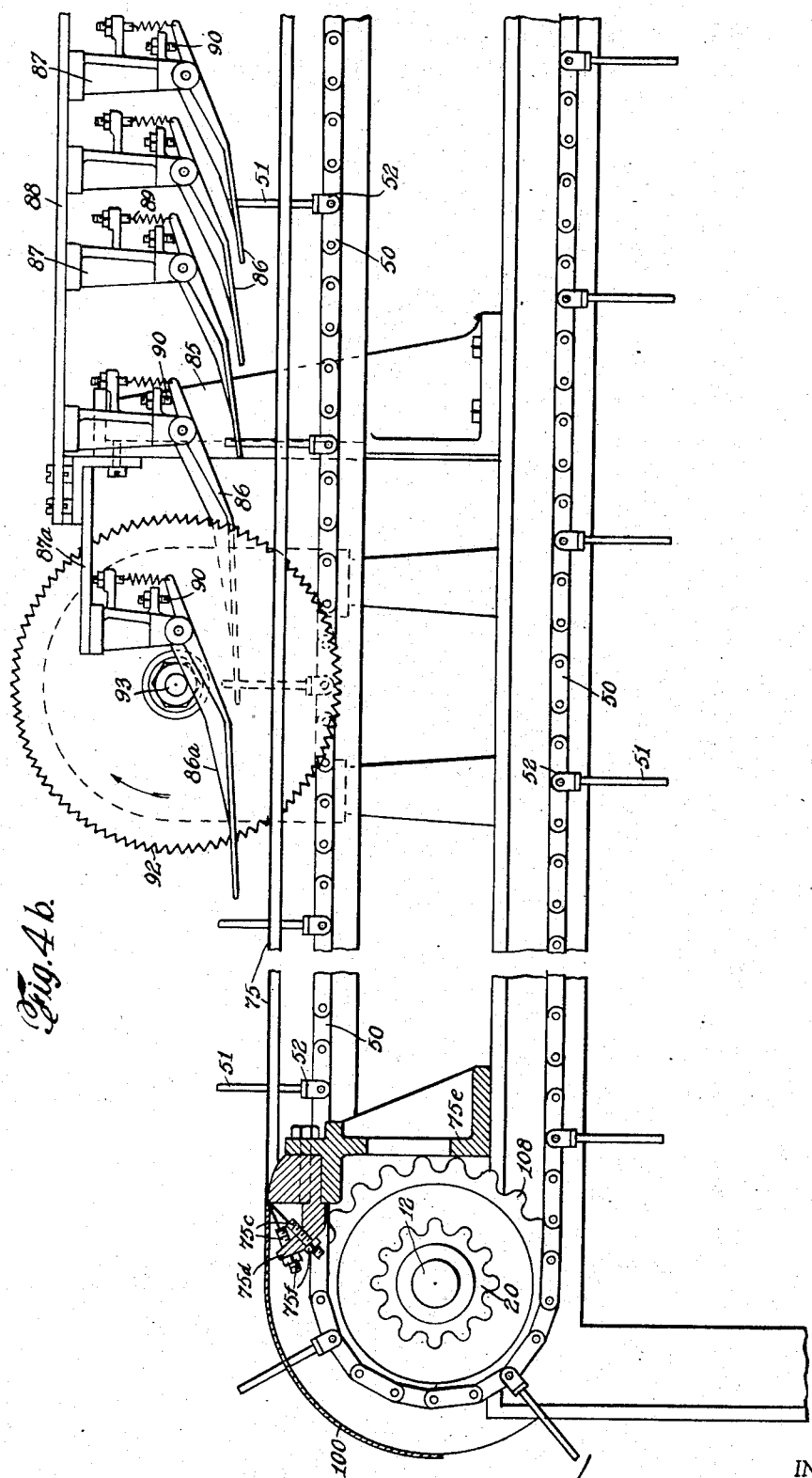
INVENTOR.
HAROLD E. RUE
BY *Wm. S. Pritchard*
ATTORNEY.

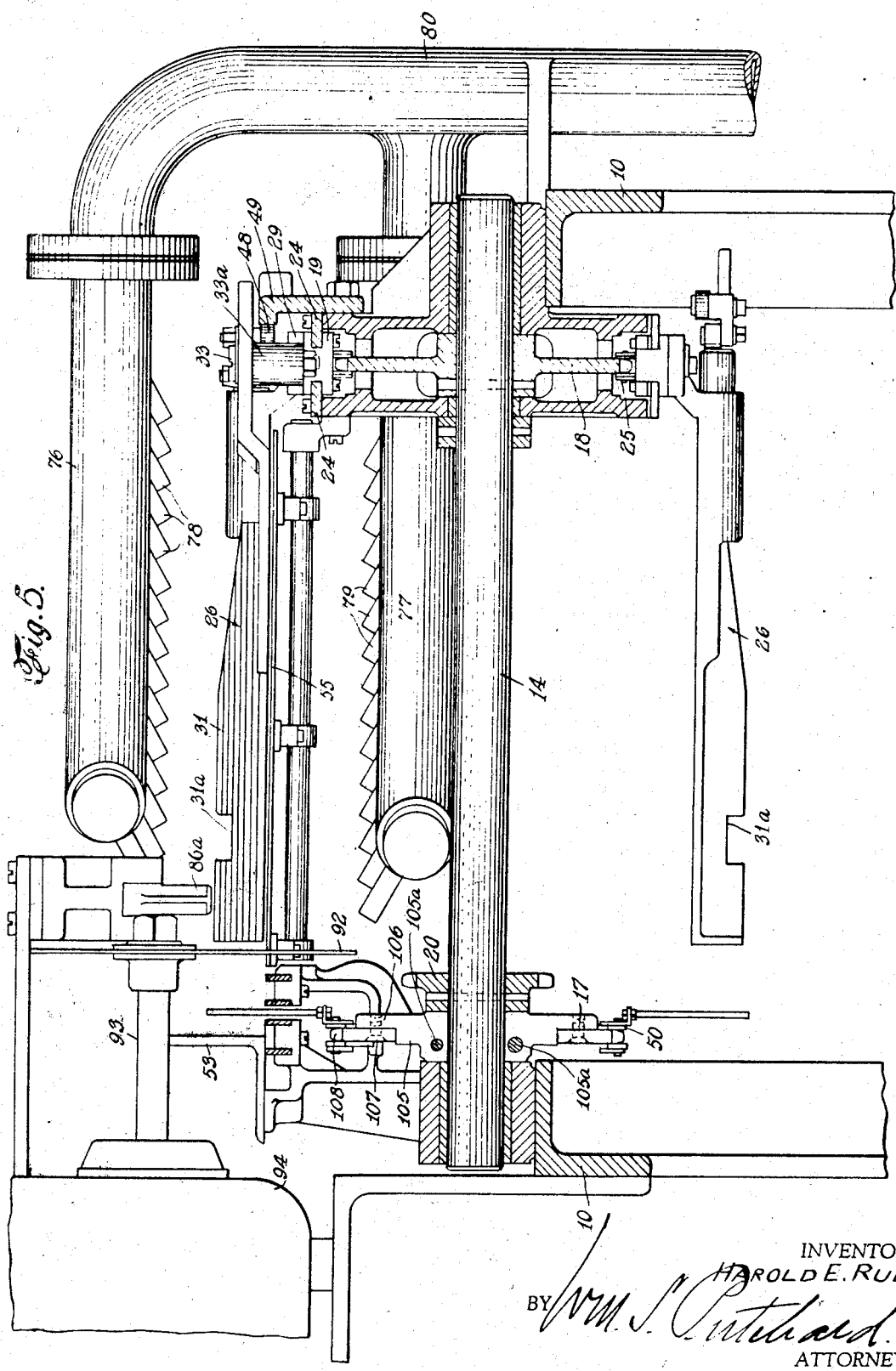

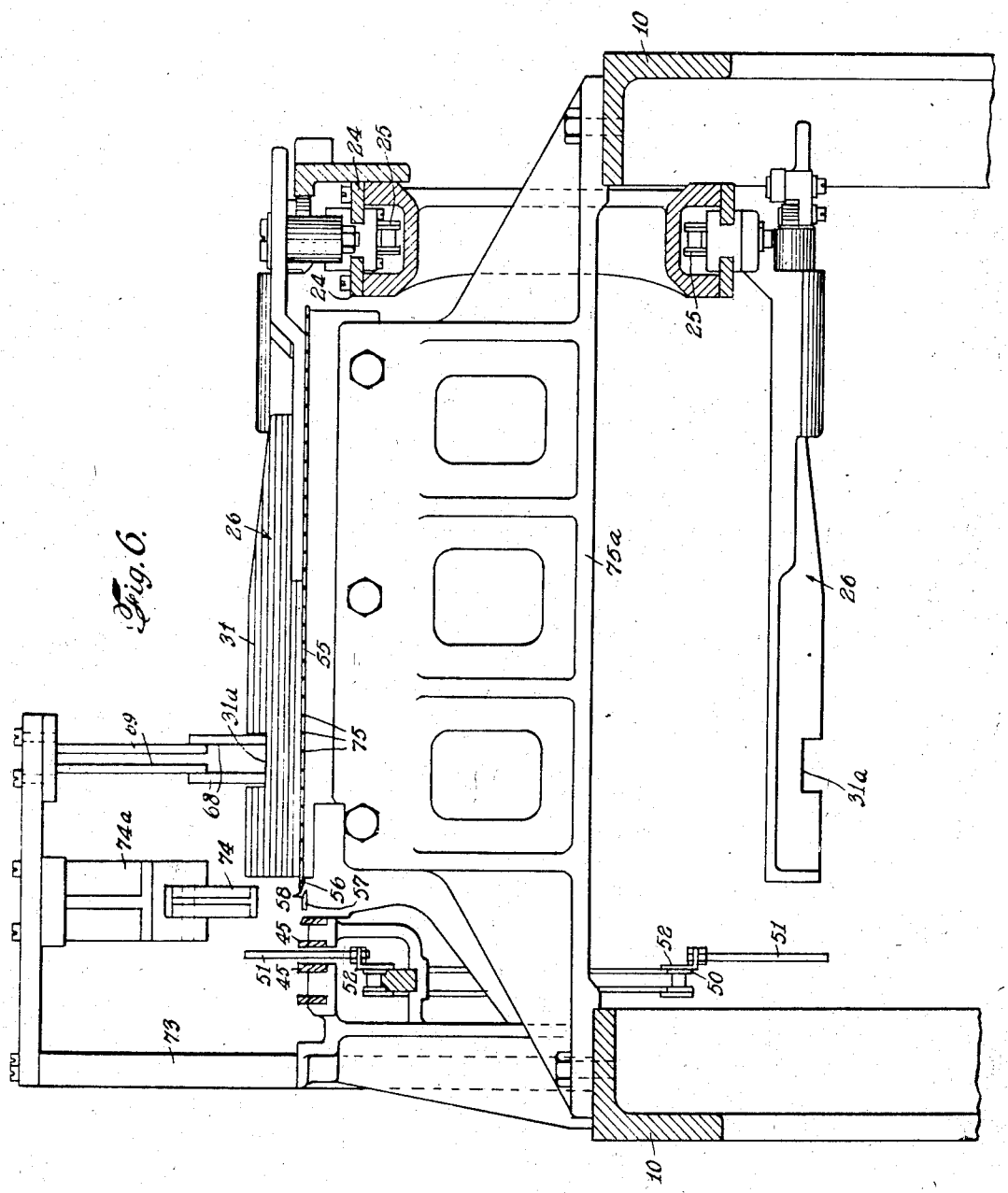

Patented July 23, 1940

2,208,644

UNITED STATES PATENT OFFICE 2,208,644

FISH TREATING MACHINE

Harold E. Rue, West Orange, N. J., assignor to The Atlantic Coast Fisheries Company, New York, N. Y., a corporation of Maine Application July 27, 1938, Serial No. 221,528

39 Claims. (Cl. 17—3)

This invention relates to a machine for scaling, beheading and cleaning fish, and has for an object to provide a machine of the above type having novel and improved operating characteristics.

Another object is to provide, in a machine of the above type, novel and improved means for continuously feeding fish to the scaling, cutting and cleaning stations.

Another object is to provide for automatically positioning the fish on the conveyor so that the head will be severed at the desired point and at the desired angle.

Another object is to provide a machine for scaling fish simultaneously on both sides as they are fed to the cutting station.

A still further object is to provide a machine of the above type which delivers the fish properly cleaned and in a condition to be applied directly to the filleting machines.

Another object is to provide positioning and gripping mechanism which is adapted to handle fish of different sizes and types.

Another object is to provide a unitary, compact and efficient machine for scaling, cutting and cleaning fish.

Various other objects and advantages will be apparent as the nature of the invention is more fully disclosed.

Although the novel features which are believed to be characteristic of this invention are pointed out more particularly in the claims appended hereto, the invention itself may be better understood by referring to the following description, taken in connection with the accompanying drawings, in which a particular embodiment thereof has been set forth for purposes of illustration.

In the drawings,

Figure 1 is a top plan view of a scaling, cutting and cleaning machine embodying the present invention;

Figure 2 is a side elevation thereof;

Figures 3, 3a and 3b are enlarged top plan views of the receiving end, the central part, and the discharge end, respectively, of the machine of Figure 1;

Figure 4A:
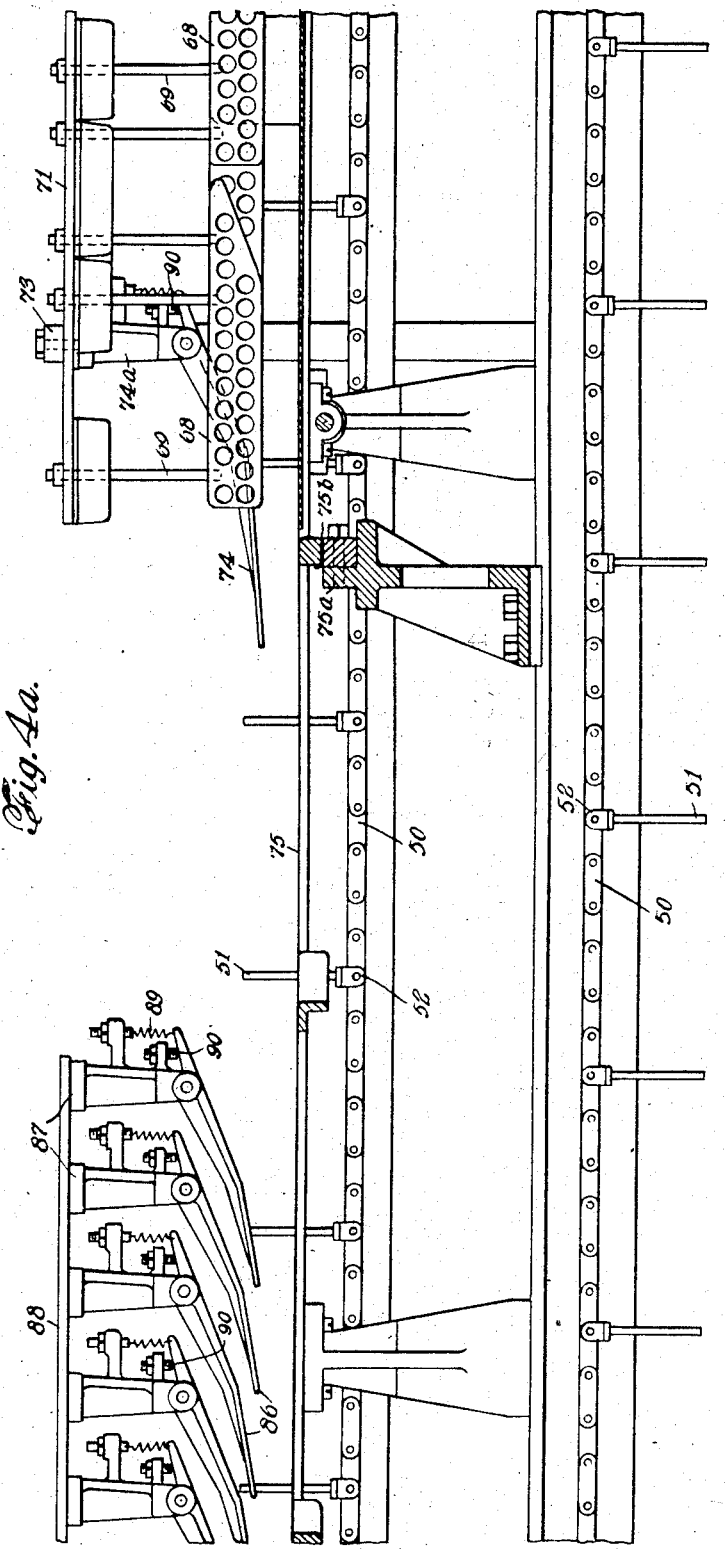

Figures 4, 4a and 4b are vertical, longitudinal sections taken along the lines 4—4, 4a—4a, and 4b—4b, respectively, of Figures 3, 3a and 3b;

Figure 5 is a transverse section at the delivery end of the machine taken along the line 5—5 of Figure 3b;

Figure 6 is a transverse section of the machine taken along the line 6—6 of Figure 3a;

Figure 7 is a detail view of one of the fin-positioning fingers; and

Figure 8 is a detail view of one of the scaling nozzles.

In the following description and in the claims, certain specific terms are used for convenience in referring to the various details of the invention. It is to be understood, however, that these terms are to be given as broad an interpretation as the state of the art will permit.

Referring to the drawings more in detail, the machine is shown as comprising a frame 10 (Figure 2) having, at opposite ends, pillow blocks 11 and 12 which support shafts 13 and 14 respectively. The shaft 13 carries conveyor sprockets 15 and 16 (Figure 3), and the shaft 14 carries conveyor sprockets 17 and 18 (Figure 5). The shaft 14 also carries a drive sprocket 20 (Figure 2) which is driven by a belt or chain 21 from a reducing gear train 22 actuated by a motor 23 of any suitable type.

The sprockets 16 and 18 carry a conveyor chain 25 (Figures 3, 5 and 6) on which are mounted at suitable intervals channel guide blocks 19 which slide between guide rails 24, extending along the frame 10 on opposite sides of the chain 25, and carry gripping devices 26 which are adapted to grip and hold the fish while being fed to the various treating stations. Each of these gripping devices comprises a block 29 which is adjustably attached to the channel guide block 19, as by a screw 27, about which it may be pivoted, and clamping screws 28 extending through arcuate slots 28a in said block 29, and carries a rigid arm 30 having a surface 31 against which the fish is positioned. An arm 32 is pivoted to the block 29 by a bolt 33 extending through a boss 3a carried by said arm, and is provided with a plurality of fingers 34 which are adapted to engage and grip the fish at or near the tail thereof. The fingers 34 are progressively shorter in length towards the end of the arm 32 and enter recesses 35 in the arm 30 so that only one or two of the fingers, for example, will come in contact with the fish, regardless of the length of the particular fish which is placed in the gripping mechanism. If, for example, the longer fingers engage the fish, the shorter fingers are held out of contact therewith. In the case of a short fish, however, the arm 32 closes towards the arm 30 until a suitable gripping contact is made.

Each arm 32 carries a roller 40 which engages a plunger 41 held in a cylinder 42 formed on the arm 30 and carrying a spring 43 which urges the plunger 41 outwardly and thereby holds the arm 32 in resilient gripping engagement with the arm 30.

For opening the gripping devices to permit the fish to be inserted and properly positioned therein, there is provided a roller 48 carried by the arm 32 and engaging a cam rail 49 which extends along the machine from a point near the receiving end to a point at which the fish has been properly positioned. As the gripping device is advanced along the machine by the chain 25, the roller 48, engaging the cam rail 49, holds the arm 32 in open position, as illustrated by the gripper in the second position in Figure 3. When the roller 48 rides off the end of the cam rail 49, the spring 43 closes the arm 32 and causes the same to grip and hold the fish. A long fish is engaged by the longer fingers 34 which keep the shorter fingers out of contact with the fish, whereas, with a shorter fish, the gripping device closes until one of the shorter fingers 34 engages the same.

The sprockets 15 and 17 carry a chain 50 (Figures 4 to 6) to which a plurality of pins 51 are attached by means of brackets 52. These pins 51 advance between horizontal plates 44 (Figure 3) and between rails 45 (Figure 3a) which are mounted on the frame 10 and extend along the machine to support the heads of the fish. A vertical guide rail 53 is mounted to extend along a part of the machine, as will be described, to form a stop for initially positioning the heads. The pins 51 are arranged in substantial alignment with the ends of the arms 30 to engage the heads which overhang the arms 30 and prevent the same from bending backwardly as they are fed through the machine by the gripping devices. This is particularly advantageous for treating long slender fish which are more flexible.

The automatic positioning mechanism is shown more in detail in Figures 3, 3a and 6 as comprising a base plate 55 on which the fish slide as they are advanced by the arms 30. The fish are manually positioned on the base plate 55, with their heads extending towards the pins 51 and the ends of the heads against the guide plate or rail 53, and preferably with their backs towards the corrugated surface 31 of an advancing arm 30. When so positioned, lateral movement of the arms 30 causes them to slide laterally until they engage the corrugated surface 31 of the arm 30. It has been found, however, that regardless of the size of the fish, the heads should be cut just in back of the pectoral fin and at an angle towards the belly such that the entrails can be easily removed. Fish of different sizes must accordingly be fed to the cutter with their heads overhanging by different amounts.

The present invention uses these pectoral fins as guides and as automatic positioning means for properly positioning the fish for cutting. For this purpose, the base plate 55 is provided with a bevelled guiding edge 56 (Figures 3, 3a and 6) beneath which is mounted a second plate 57 having a bevelled edge 58 extending beneath the edge 56 of the plate 55 so as to receive the pectoral fin of the fish therebetween. The guiding edge 56 extends at an angle to the direction of feed so as to shift the fish transversely of the machine to a predetermined position. The trailing portion 56a of the edge 56 is extended parallel to the direction of feed so as to hold the fish in adjusted position until the gripping devices close thereon. The guide rail 53 terminates at a suitable point to release the head of the fish after the fin has been engaged by the edge 56 of the plate 55 in the manner above mentioned.

After the fish has advanced beyond the end of the edge 56 of the base plate 55, the roller 48 of the arm 32 rides off the end of the cam rail 49, as shown in Figure 3a, thereby permitting the arm 32 to close and grip the fish to hold the same against further transverse movement.

The base of the pectoral fin is strongly attached to the body of the fish and provides a dependable guiding and positioning means. This fin, however, is thin and flexible at the end and may adhere to the body of the fish, particularly when wet as in the present machine. Means is accordingly provided to loosen the fin from the body so that it can extend beneath the plate 55 as above mentioned. For this purpose, a plurality of fingers 60 are provided ahead of the edge 56 and extending through slots 61 in the base plate 55. These fingers 60, as shown more in detail in Figures 4 and 7, are each pivoted to a bracket 62 which is mounted beneath the base plate 55 and are held in suitable position with respect to the base plate by means of a stop screw 63. A spring 64, attached to each finger 60, is anchored to an ear 65 on the bracket 62 for normally holding the finger in a position to project through the slot 61. As the fish is fed past these fingers 60, they engage the pectoral fin, loosening the same from the body, and causing it to lie in a position to extend beneath the edge 56 above mentioned as the fish is fed thereto.

In order to hold the fish down against the base plate 55 with the front fin in position to extend beneath the edge 56 thereof, a plurality of presser bars 68 are provided having substantially straight bottom edges, beneath which the fish slide (Figures 4 and 4a). These presser bars 68 are each mounted on a pair of rods 69 which extend loosely through apertures 70 (Figures 3 and 3a) in a bar 71 mounted on brackets 72 and 73 attached to the frame 10. The bars 68 are held downwardly by their own weight and are designed to hold the fish down against the base plate 55 with the fin extending under the edge 56 thereof in the manner above described, and to prevent the fish from turning as it advances. The alternate bars 68 are mounted on opposite sides of the bar 71 with their ends overlapping to continuously engage the fish as they are fed along the machine. The bars 68 are shown as extending over the plates 55 and 57 at a position to engage the body of the fish. They may, however, be located at other parts of the machine, if found desirable.

A pivoted arm 74 may be mounted on a bracket 74a attached to the bracket 73. This arm 74 may engage and hold the fish after the same has been positioned by the guiding edge 56 and until it is secured by the closing of the gripping devices 26. The bars 68 and the arm 74 prevent the fish from turning as it advances. Of course, a plurality of such arms 74 may be used if desired, which may extend along the machine to hold the fish as it is advanced to the scaling and cutting stations.

Extending from the end of the base plate 55 to the discharge end of the machine are a plurality of longitudinal supporting wires 75 (Figures 1, 3a and 3b). These wires 75 and the guide rails 45 interpose a minimum amount of friction to the sliding fish and allow free passage of the spray for scaling, to be described. The wires 75 are held at one end by a cross bracket 75a (Figure 4a) extending across the machine and having apertures 75b through which the ends of the wires extend. At the other end, the wires 75 are attached to screws 75c (Figure 4b) held in a cross bar 75d mounted on a bracket 75e. The screws 75c are provided with adjusting nuts 75f by which the tension on the wires 75 may be adjusted.

Mounted above and below the wires 75 are headers 76 and 77 having nozzles 78 and 79 respectively, which are adapted to direct water under pressure against the top and bottom of the fish for removing the scales therefrom. It will be noted that the headers 76 and 77 are connected by a pipe 80 to the discharge end of a pump 81 (Figure 2) which receives water from a tank 82 and supplies the same under pressure to the nozzles 78 and 79 for the purpose above mentioned. The tank 82 is positioned beneath the wires 75 so as to receive the water and scales from the nozzles 78 and 79. A screen 83 may be provided in the tank 82 to separate the scales and permit the water to be used in a continuous cycle.

The headers 76 and 77 are at an angle to the direction of travel of the fish, and the nozzles 78 and 79 direct a stream of water or other fluid in an inclined direction towards the head of the fish, the various nozzles progressively treating the fish from the tail to the head so as to effectively strip the scales therefrom. The nozzles may have a flattened end, as shown in Figure 8, to cause the stream to spread along the fish. While in the drawings the nozzles are shown directing the sprays to scale the fish from the tail towards the head, it is to be understood, however, that with certain types of fish where the scales are large and very strongly attached to the body, it may be desirable to scale the fish in the opposite direction; that is, from the head to the tail. To accomplish this, the headers will be mounted at a point further along the machine and will point in the opposite direction, the nozzles being so adjusted that the first sprays will strike the fish so as to remove the scales near the head, and the other sprays striking the fish progressively down to the tail.

After the fish has been scaled in the above manner, it is fed to a rotating saw 92, shown in Figures 3b and 4b. This saw 92 is mounted on a shaft 93 which is driven by a motor 94 and is so positioned with respect to the guiding edge 56, above mentioned, that the fish will be cut just in back of the pectoral fin and along a line extending at an angle toward the belly as determined by the angularity of the arms 30. A pin 92a is mounted on the frame and is adapted to hit the head of the fish just as it is severed by the saw 92.

For holding the fish down against the wires 75 during the scaling and cutting operations, there are provided a plurality of spring-pressed fingers 86 (Figures 3a, 3b, 4a and 4b). Each finger 86 is pivotally mounted on a bracket 87 which is carried by a bar 88 supported by brackets 85 from the frame 10, and is held by a spring 89 in proper position to resiliently engage the fish. A screw 90 may be provided to form an adjustable stop for the finger 86. The row of fingers 86 may extend along the side of the machine to engage and hold the heads of the fish so as to prevent shifting thereof during the scaling and cutting operations. A finger 86a may be mounted on a bracket 87a in a position to engage the body of the fish opposite the saw 92 so as to hold the same against displacement by the rotation of the saw. These fingers may also be extended along the machine to replace some or all of the bars 68, or, if desired, the bars 68 may extend past the cutting station and replace the fingers 86, or any desired combination of the bars 68 and fingers 86 may be used.

The removal of the head of the fish in the manner above mentioned permits the greater part of the entrails to fall out and leaves the fish in a comparatively clean condition. If it is desired to further clean the fish, this may be accomplished by providing one or more jets 98, which are positioned so as to discharge fluid under pressure into the nape cavity of the fish and thereby wash out the entrails and clean the inside thereof. The jets 98 may be connected to the pipe 80 or may be supplied with fluid under pressure in any other suitable manner.

At the discharge end, the machine is provided with a discharge plate 100 (Figures 1 and 3b). A circular cam rail 101 is also provided to engage the roller 48 and open the arm 32, thereby releasing the fish from the gripping device and permitting the same to fall into a suitable receptacle (not shown) beneath the discharge plate 100.

It will be noted that provision is made for adjusting the angular position of the arms 30. Provision may also be made for adjusting the position of the pins 51 so that the pins remain in proper alignment with the ends of the arms 30. For this purpose, the sprocket 17 is provided with a split hub 105 having a flange 106 to which a split sprocket ring 107 is secured by screws as shown. The split ring 107 is provided with teeth 108 engaging the chain 50. By loosening the bolts 105a, the split hub may be loosened on the driving shaft 14 and turned backward or forward and the bolts 105a again tightened in order to position the pins 51 as desired.

In the operation of this machine, as the grippers are advanced from the feeding end, the arm 32 is opened by the roller 48 engaging the cam rail 49. The fish are now manually placed on the base plate 55 with their backs towards the corrugated face 31 of the arm 30 of the gripper and with their heads extending against the guide rail 53. In this position, the heads rest upon the plates 44 and are engaged by the pins 51 which advance with the arms 30. As the fish are now advanced by the arms 30 over the base plate 55, the lower pectoral fin is engaged by the fingers 60, which loosen the fin from the body, if it happens to be stuck thereto or otherwise improperly positioned, and cause the same to lie flat against the base plate 55. During this part of its movement, the fish is positioned by the end of the head resting against the guide rail 53.

As the fish is further advanced by the arm 30 (with the arm 32 still held in open position by the cam rail 49), the pectoral fin is caused to extend beneath the guiding edge 56 of the base plate 55. As the fin slides along this edge 56, the fish is advanced transversely of the machine to a position dependent upon the trailing portion 56a of said edge. During this portion of its travel, the fish is held down against the base plate by the presser bars 68. The arms 30 are all provided with slots 31a so as to permit the presser bars 68 to extend downwardly to the maximum point in order that they may engage and hold down the smallest fish which can be treated by the machine. Otherwise, the presser bars 68 would ride on the edges of the arms 30 and, in the event the thickness of the fish to be treated was not thicker than the corrugated surfaces 31 of the arms 30, the presser bars 68 would not engage the smaller fish. As the fish is advanced transversely by the guiding edge 56, the head is caused to extend laterally beyond the end of the guide rail 53 and is supported by the rails 44. The roller 48 now rides off the end of the cam rail 49, permitting the arm 32 to close against the fish, thereby securely holding the fish against further transverse movement.

It will be noted that the arm 32 grips and securely holds the fish regardless of the size thereof. A long fish, for example, is gripped by the longer fingers 34, which hold the remaining fingers out of contact with the fish, whereas a shorter fish is engaged by the shorter fingers 34. In any event, only one or two of the fingers contacts with the fish. This is an important feature, inasmuch as the fingers 34 would otherwise interfere with the subsequent scaling operation.

The fish, now held clamped by the gripping device 26, is advanced over the longitudinal wires 75 past the nozzles 78 and 79, which direct fluid under pressure against the top and bottom of the fish and progressively from the tail to the head thereof, so as to effectively strip the scales therefrom. During this portion of its travel, the fish is held against displacement by the fingers 86 which engage the fish near the head thereof and prevent the same from being shifted, turned or otherwise displaced in the gripping device.

The fish, now scaled, is then further advanced to the cutting saw 92 which severs the head at a point in back of the pectoral fin and along a line which extends at an angle toward the belly of the fish. The particular location of the cut is determined by the location of the saw 92 with respect to the guiding edge 56. The angle at which the head is cut is determined by the angle of the arms 30. This may be adjusted by means of the screws 27 and 28 in the manner above pointed out, suitable adjustment also being made to cause the pins 51 to engage the heads of the fish which overhang the end of the arms 30. The pin 92a secured to the side of the machine strikes the overhanging head of the fish and removes it after it has been severed by the saw.

It has been found that a cut of the above nature may be made sufficiently into the belly of the fish to cause most of the entrails to fall out of their own accord and leave the fish in a comparatively clean condition. If any further cleaning is required, the same may be effected by the jets 98 which are positioned to direct a stream of fluid into the nape cavity of the fish for washing out and cleaning the inside thereof. The fish, which has now been scaled, cut and cleaned, is advanced to the discharge plate 100, where the roller 48 is engaged by the circular cam rail 101 to open the arm 32 and thereby release the fish, which falls into a suitable receptacle.

It will be noted that the above-described machine automatically positions the fish, scales, cuts and cleans the same in a continuous operation and without intervening manual attention. Furthermore, the machine, by reason of the construction of the grippers and the positioning mechanism, is adapted to operate on different sizes of fish without requiring adjustment.

The positioning means operates automatically after the fish has been manually placed on the base plate 55 ahead of an advancing arm 30 and with its head at or near the guide rail 53. The pectoral fin is automatically loosened from the body and is engaged by the edge 56 of the base plate for positioning the fish for cutting. It is accordingly only necessary for the attendant to place the fish on the base plate with its back towards an advancing arm. The mechanism then automatically positions, scales, cuts and cleans the fish without further attention.

Certain types of fish may be positioned with their bellies towards the surface 31 of the arms 30, and the arms may extend forwardly instead of rearwardly as shown, so as to cut the heads along any desired line. The arms 30 may also be adjusted to cause the cut to extend far back towards the belly, if desired, and may be varied in accordance with the requirements of the fish being treated.

Although a particular embodiment of the invention has been shown for purposes of illustration, it is to be understood that various changes and modifications may be made therein, as will readily appear to a person skilled in the art. The invention is only to be limited in accordance with the following claims when interpreted in view of the prior art.

I claim:

1. In a machine for beheading fish, a cutting member, conveyor means to feed fish sidewise to said cutting member and means for positioning the fish on said conveyor means comprising a guide member having an edge extending at an angle to the direction of feed and adapted to engage the pectoral fin of the fish as the fish is advanced and to thereby shift the fish across said conveyor means to a predetermined position with respect to the cutting member.

2. In a machine for beheading fish, a cutting member, conveyor means to feed fish sidewise to said cutting member and means for positioning the fish on said conveyor means comprising a guide member adapted to engage the pectoral fin of the fish as the fish is advanced, said guide member extending at an angle toward the head of the fish so as to shift the fish laterally across the conveyor as the pectoral fin slides along said member.

3. In a machine for beheading fish, a cutting member, conveyor means to feed fish sidewise to said cutting member and means for positioning the fish on said conveyor means comprising a member over which the fish slides having an edge to engage the pectoral fin of the fish as the fish is advanced thereover, said edge extending at an angle to the direction of feed adapted to shift the fish across said conveyor means to a predetermined position with respect to the cutting member.

4. In a machine for beheading fish, a cutting member, conveyor means to feed fish sidewise to said cutting member and means for positioning the fish on said conveyor means comprising a plate over which the fish slides, said plate having a side edge adapted to engage the pectoral fin of the fish as the fish is advanced thereover, said edge extending at an angle to the direction of feed adapted to shift the fish across said conveyor means to a predetermined position with respect to the cutting member.

5. In a machine for beheading fish, a cutting member, conveyor means to feed fish sidewise to said cutting member and means for positioning the fish on said conveyor means comprising a plate over which the fish slides, said plate having a side edge adapted to engage the pectoral fin of the fish as the fish is advanced thereover, said edge extending at an angle to the direction of feed adapted to shift the fish across said conveyor means to a predetermined position with respect to the cutting member, and a second plate to support the portion of the fish beyond said edge, said second plate extending underneath said edge to assist in positioning the fin thereunder.

6. In a machine for beheading fish, a cutting member, conveyor means to feed fish sidewise to said cutting member and means for positioning the fish on said conveyor means comprising a plate over which the fish slides, said plate having a side edge adapted to engage the pectoral fin of the fish as the fish is advanced thereover, said edge extending at an angle to the direction of feed adapted to shift the fish across said conveyor means to a predetermined position with respect to the cutting member, and having a trailing part extending parallel to the direction of feed so as to hold the fish in said predetermined position.

7. In a fish-treating machine, a conveyor means to feed fish sidewise, and a guide member adapted to engage the pectoral fin of the fish as the fish is advanced, said guide member extending at an angle to the direction of feed so as to shift the fish across said conveyor as the fin slides along the guide member.

8. In a fish-treating machine, a conveyor means having a plurality of arms against which fish are positioned for feeding through the machine, a guide rail to engage and position the head of each fish as it is advanced by said arms, and positioning means engaging beneath the pectoral fin of the fish for positioning the same on said conveyor means, said guide rail terminating at a point with respect to said positioning means to release the head and permit free movement of the fish by said positioning means.

9. In a machine for beheading fish, a cutting member, conveyor means to feed fish sidewise to said cutting member and means for positioning the fish on said conveyor means comprising a plate over which the fish slides, said plate having a side edge adapted to engage the pectoral fin of the fish as the fish is advanced thereover, said edge extending at an angle to the direction of feed adapted to shift the fish across said conveyor means to a predetermined position with respect to the cutting member, and means associated with said plate to engage said fin ahead of said edge to properly position the fin to cooperate therewith.

10. In a machine for beheading fish, a cutting member, conveyor means to feed fish sidewise to said cutting member and means for positioning the fish on said conveyor means comprising a plate over which the fish slides, said plate having a side edge adapted to engage the pectoral fin of the fish as the fish is advanced thereover, said edge extending at an angle to the direction of feed adapted to shift the fish across said conveyor means to a predetermined position with respect to the cutting member, and means projecting upwardly from said plate to engage said fin ahead of said edge to properly position the fin to cooperate therewith.

11. In a machine for beheading fish, a cutting member, conveyor means to feed fish sidewise to said cutting member and means for positioning the fish on said conveyor means comprising a plate over which the fish slides, said plate having a side edge adapted to engage the pectoral fin of the fish as the fish is advanced thereover, said edge extending at an angle to the direction of feed adapted to shift the fish across said conveyor means to a predetermined position with respect to the cutting member, and a finger projecting upwardly through said plate to engage said fin ahead of said edge to properly position the fin to cooperate therewith.

12. In a machine for beheading fish, a cutting member, conveyor means to feed fish sidewise to said cutting member and means for positioning the fish on said conveyor means comprising a plate over which the fish slides, said plate having a side edge adapted to engage the pectoral fin of the fish as the fish is advanced thereover, said edge extending at an angle to the direction of feed adapted to shift the fish across said conveyor means to a predetermined position with respect to the cutting member, and a plurality of spring-pressed fingers projecting upwardly through said plate to engage said fin ahead of said guide member for properly positioning the fin to cooperate therewith.

13. In a machine for beheading fish, a cutting member, conveyor means to feed fish sidewise to said cutting member and means for positioning the fish on said conveyor means comprising a plate over which the fish slides, said plate having a side edge adapted to engage the pectoral fin of the fish as the fish is advanced thereover, said edge extending at an angle to the direction of feed adapted to shift the fish across said conveyor means to a predetermined position with respect to the cutting member, and a plurality of resiliently mounted fingers projecting upwardly through said plate to engage said fin ahead of said guide member for properly positioning the fin to cooperate therewith.

14. In a fish-treating machine, a conveyor means to feed fish sidewise, a guide member adapted to engage the pectoral fin of the fish as the fish is advanced, said guide member extending at an angle to the direction of feed so as to shift the fish across said conveyor as the fin slides along the guide member, and means engaging the fin ahead of said guide member for properly positioning the fin to cooperate therewith.

15. In a machine for beheading fish, a cutting member, conveyor means to feed fish sidewise to said cutting member and means for positioning the fish on said conveyor means comprising a member over which the fish slides having an edge to engage the pectoral fin of the fish as the fish is advanced thereover, said edge extending at an angle to the direction of feed adapted to shift the fish across said conveyor means to a predetermined position with respect to the cutting member, and presser means to hold the fish in proper engagement with said member as the fish is advanced thereover.

16. In a machine for beheading fish, a cutting member, conveyor means to feed fish sidewise to said cutting member and means for positioning the fish on said conveyor means comprising a member over which the fish slides having an edge to engage the pectoral fin of the fish as the fish is advanced thereover, said edge extending at an angle to the direction of feed adapted to shift the fish across said conveyor means to a predetermined position with respect to the cutting member, and a plurality of presser bars adapted to hold the fish in proper engagement with said member as the fish is advanced thereover.

17. In a machine for beheading fish, a cutting member, conveyor means to feed fish sidewise to said cutting member and means for positioning the fish on said conveyor means comprising a member over which the fish slides having an edge to engage the pectoral fin of the fish as the fish is advanced thereover, said edge extending at an angle to the direction of feed adapted to shift the fish across said conveyor means to a predetermined position with respect to the cutting member, and a plurality of presser bars adapted to hold the fish in proper engagement with said member as the fish is advanced thereover, said bars being loosely mounted for movement to permit the fish to pass thereunder.

18. In a machine for beheading fish, a cutting member, conveyor means to feed fish sidewise to said cutting member and means for positioning the fish on said conveyor means comprising a member over which the fish slides having an edge to engage the pectoral fin of the fish as the fish is advanced thereover, said edge extending at an angle to the direction of feed adapted to shift the fish across said conveyor means to a predetermined position with respect to the cutting member, and a plurality of presser bars adapted to hold the fish in proper engagement with said member as the fish is advanced thereover, said bars extending along said conveyor means to successively engage the fish and having substantially straight lower edges adapted to prevent the fish from turning on said conveyor means.

19. In a machine for beheading fish, a cutting member, conveyor means to feed fish sidewise to said cutting member and means for positioning the fish on said conveyor means comprising a member over which the fish slides having an edge to engage the pectoral fin of the fish as the fish is advanced thereover, said edge extending at an angle to the direction of feed adapted to shift the fish across said conveyor means to a predetermined position with respect to the cutting member, and a plurality of presser bars adapted to hold the fish in proper engagement with said member as the fish is advanced thereover, said bars extending along said conveyor means substantially in alignment with said edge.

20. In a machine for beheading fish, a cutting member, conveyor means to feed fish sidewise to said cutting member and means for positioning the fish on said conveyor means comprising a guide member adapted to engage the pectoral fin of the fish as the fish is advanced and to thereby shift the fish across said conveyor means to a predetermined position with respect to the cutting member, and a plurality of presser bars extending along said conveyor means to hold the fish in proper position thereon, said bars being mounted for independent movement as the fish engages the same.

21. In a machine for beheading fish, a cutting member, conveyor means to feed fish sidewise to said cutting member and means for positioning the fish on said conveyor means comprising a guide member adapted to engage the pectoral fin of the fish as the fish is advanced and to thereby shift the fish across said conveyor means to a predetermined position with respect to the cutting member, a plurality of horizontal presser bars extending along said conveyor means to hold the fish in proper position thereon, rods carrying each bar, and a bracket loosely holding each rod to permit vertical movement of the presser bars as the fish passes thereunder.

22. In a machine for beheading fish, a cutting member, conveyor means to feed fish sidewise to said cutting member and means for positioning the fish on said conveyor means comprising a guide member adapted to engage the pectoral fin of the fish as the fish is advanced and to thereby shift the fish across said conveyor means to a predetermined position with respect to the cutting member, and a set of fingers mounted to engage and hold the fish on said conveyor means, each finger being pivotally mounted and having means resiliently holding the same in pressure engagement with the fish as the fish is passed thereunder.

23. In a machine for beheading fish, a cutting member, conveyor means to feed fish sidewise to said cutting member and means for positioning the fish on said conveyor means comprising a guide member adapted to engage the pectoral fin of the fish as the fish is advanced and to thereby shift the fish across said conveyor means to a predetermined position with respect to the cutting member, and a set of presser fingers mounted to engage the fish at the cutting station to hold the body during the cutting operation.

24. In a machine for beheading fish, a cutting member, conveyor means to feed fish sidewise to said cutting member comprising a clamp adapted to grip the fish near the tail thereof, means holding said clamp open for a predetermined range of feed movement, and a member adapted to engage beneath the pectoral fin of the fish for positioning the same while said clamp is open.

25. In a fish-treating machine, conveyor means comprising a plurality of gripping devices adapted to grip and feed fish sidewise through the machine for treatment therein, each gripping device comprising an arm having a surface against which the fish rests, and having a pivoted arm provided with a plurality of fingers adapted to engage and hold the fish against said first arm.

26. In a fish-treating machine, conveyor means comprising a plurality of gripping devices adapted to grip and feed fish sidewise through the machine for treatment therein, each gripping device comprising an arm having a surface against which the fish rests, and a pivoted arm having a plurality of fingers adapted to engage and hold the fish against said first arm, said fingers being of lengths progressively decreasing towards the end of said pivoted arm whereby fish of different lengths are engaged by different sets of fingers.

27. In a fish-treating machine, conveyor means comprising a plurality of gripping devices adapted to grip and feed fish sidewise through the machine for treatment therein, each gripping device comprising an arm having a surface against which the fish rests and having a pivoted arm adapted to engage and hold the fish against said first arm, a cam rail extending along said machine, and means associated with said pivoted arm to engage said cam rail to hold the pivoted arm in open position.

28. In a fish-treating machine, conveyor means comprising a plurality of gripping devices adapted to grip and feed fish sidewise through the machine for treatment therein, each gripping device comprising an arm having a surface against which the fish rests and having a pivoted arm adapted to engage and hold the fish against said first arm, a cam rail extending along said machine, means associated with said pivoted arm to engage said cam rail to hold the pivoted arm in open position to receive a fish, and a cam member engaging said last means to open said pivoted arm for discharging the fish after treatment.

29. In a fish-treating machine, conveyor means comprising a plurality of gripping devices adapted to grip and feed fish sidewise through the machine for treatment therein, each gripping device comprising an arm having a surface against which the fish rests and having a pivoted arm adapted to engage and hold the fish against said first arm, spring means carried by said first arm to hold said pivoted arm in closed position, a cam rail extending along said machine, and means associated with said pivoted arm to engage said cam rail to hold the pivoted arm in open position.

30. In a fish-treating machine, conveyor means comprising a plurality of gripping devices adapted to grip and feed fish sidewise through the machine for treatment therein, each gripping device comprising an arm having a surface against which the fish rests, and a pivoted arm having a plurality of fingers adapted to engage and hold the fish against said first arm, said fingers being of lengths progressively decreasing towards the end of said pivoted arm whereby fish of different lengths are engaged by different sets of fingers, said first arm having recesses to receive said fingers when said pivoted arm is closed.

31. In a fish-treating machine, conveyor means comprising a plurality of gripping devices adapted to grip and feed fish sidewise through the machine for treatment therein, each gripping device comprising an arm having a surface against which the fish rests, and having a pivoted arm adapted to engage and hold the fish against said first arm, said gripping devices being mounted for angular adjustment to vary the transverse angular position of said arm.

32. In a fish-treating machine, conveyor means comprising a pair of feed chains on opposite sides thereof, gripping devices carried by one of said chains and adapted to support and hold the fish at or near the tail thereof, and pins carried by the other of said chains adapted to engage and support the head of the fish while being fed through the machine.

33. In a fish-treating machine, conveyor means comprising a pair of feed chains on opposite sides thereof, gripping devices carried by one of said chains and adapted to support and hold the fish at or near the tail thereof, members carried by the other of said chains adapted to engage and support the head of the fish while being fed through the machine, means adjusting the transverse angular position of said gripping devices, and means adjusting said members to compensate for changes in the position of the head caused by said first adjusting means.

34. In a fish-treating machine, conveyor means to feed fish through the machine including spaced longitudinal wires adapted to support the fish and to expose both sides thereof, bottom and top discharge nozzles adapted to discharge fluid under pressure onto the bottom and top of said fish so as to strip the scales therefrom as it is fed through said machine, a tail clamp to hold the tail of the fish during the scaling operation, and hold-down means engaging the fish near the head to prevent the fish from being displaced by the force of the fluid.

35. In a fish-treating machine, conveyor means to feed fish through the machine including spaced longitudinal wires adapted to support the fish and to expose both sides thereof, bottom and top discharge nozzles adapted to discharge fluid under pressure onto the bottom and top of said fish so as to strip the scales therefrom as it is fed through said machine, a tail clamp to hold the tail of the fish during the scaling operation, and hold-down means engaging the fish near the head to prevent the fish from being displaced by the force of the fluid, said hold-down means comprising a set of pivoted fingers mounted to resiliently engage the fish as the fish passes thereunder.

36. In a fish-treating machine, conveyor means to feed fish through the machine including spaced longitudinal wires adapted to support the fish and to expose both sides thereof, bottom and top discharge nozzles adapted to discharge fluid under pressure onto the bottom and top of said fish so as to strip the scales therefrom as it is fed through said machine, a tail clamp to hold the tail of the fish during the scaling operation, and hold-down means engaging the fish near the head to prevent the fish from being displaced by the force of the fluid, said hold-down means comprising a set of spring-pressed pivoted fingers mounted to engage the fish as the fish passes thereunder.

37. In a fish-treating machine, conveyor means to feed fish through the machine including spaced longitudinal wires adapted to support the fish and to expose both sides thereof, clamping means for holding the fish in predetermined position on said wires, bottom and top discharge nozzles adapted to discharge fluid under pressure onto the bottom and top of said fish, said nozzles being arranged in rows inclined to the direction of feed and directing the fluid onto the fish at an angle towards the head so as to progressively strip the scales from the tail to the head as the fish is advanced through the machine.

38. In a fish-treating machine comprising a base plate and a plurality of spaced longitudinal wires over which the fish is adapted to slide, upper and lower fluid-pressure scaling means mounted above and below said wires to treat the fish as it is fed thereover, cutting means disposed to remove the head of the fish after treatment by said fluid-pressure means, traveling gripper devices adapted to grip and feed the fish past said scaling and cutting means, and a guide member positioned to engage beneath the pectoral fin of the fish and to shift the fish laterally to a predetermined position with respect to said cutting means so that the head is removed at a predetermined point in back of said pectoral fin.

39. In a fish-treating machine comprising a base plate and a plurality of spaced longitudinal wires over which the fish is adapted to slide, upper and lower fluid-pressure scaling means mounted above and below said wires to treat the fish as it is fed thereover, cutting means disposed to remove the head of the fish after treatment by said fluid-pressure means, traveling gripper devices adapted to grip and feed the fish past said scaling and cutting means, a guide member positioned to engage beneath the pectoral fin of the fish and to shift the fish laterally to a predetermined position with respect to said cutting means so that the head is removed at a predetermined point in back of said pectoral fin, and cleaning means comprising a jet located beyond said cutting means and adapted to direct a fluid under pressure into the nape cavity of the fish for cleaning the same after the head has been removed.

HAROLD E. RUE.